(No Model.)

M. W. DEWEY.
ELECTRO MAGNETIC TRACTION INCREASING SYSTEM.

No. 441,828. Patented Dec. 2, 1890.

WITNESSES:
J. J. Laass
C. L. Bendixon

INVENTOR,
Mark W. Dewey
BY
Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRO-MAGNETIC TRACTION-INCREASING SYSTEM.

SPECIFICATION forming part of Letters Patent No. 441,828, dated December 2, 1890.

Application filed August 25, 1890. Serial No. 362,993. (No model.)

*To all whom it may concern:*

Be it known that I, MARK W. DEWEY, of Syracuse, in the county of Onondaga, in the State of New York, have invented new and useful Improvements in Electro-Magnetic Traction-Increasing Systems for Railways, (Case No. 71,) of which the following, taken in connection with the accompanying drawings, is a full, clear, and exact description.

My invention relates to a new and improved apparatus for electro-magnetically increasing the traction of vehicles or cars moving upon a metallic track.

The object of my invention is to provide means for electrically increasing the traction of vehicles when they are upon grades or curves or other portions of the railway where an adhesive effect is necessary or desired between the track and wheels and without supplying and carrying upon each and every vehicle moving on the railway extra heavy and expensive apparatus for this purpose. Usually the greater portion of a railway is level, or substantially so, and vehicles or cars traveling thereon do not need increased traction; but when they are upon the steep grades of the railway—such as those met with on opposite sides of canal-bridges, &c.—increased traction is necessary, and to supply railways having such grades with increased traction is the purpose of my invention.

To this end my invention consists in the combination, in an apparatus for electrically increasing the traction of a vehicle moving upon a railway, of a source of electricity, coils distributed at intervals along the railway, a circuit leading from the source of electricity and including the coils, stationary cores in the said coils having their poles connected to or in contact with the rails, and the wheels and axles of the vehicle.

My invention consists, also, in certain other combinations hereinafter described, and specifically set forth in the claims.

Figure 1:
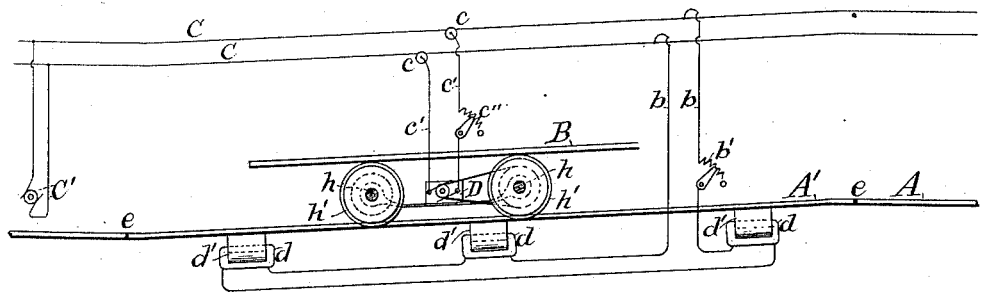
Figure 2:
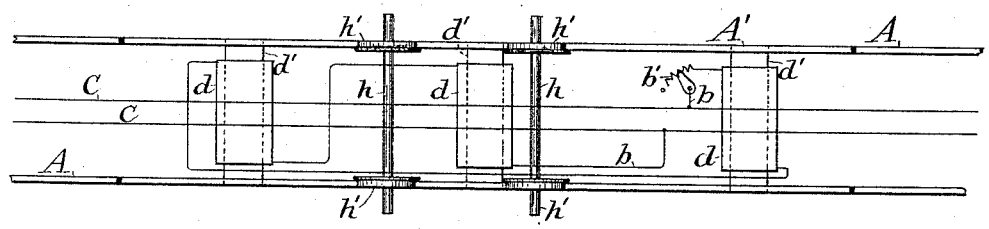
Figure 3:
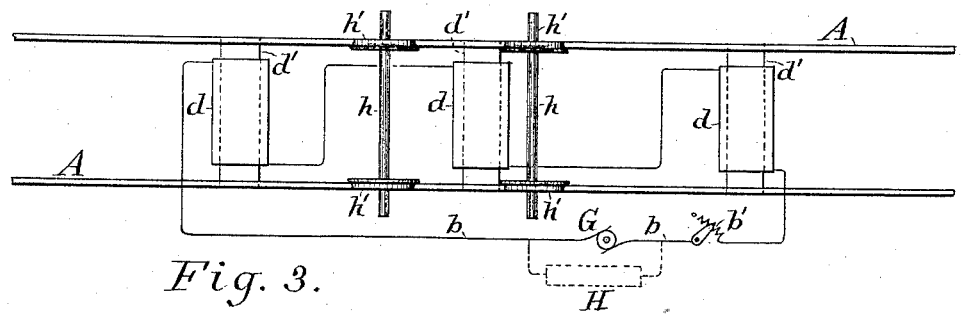
Figure 4:
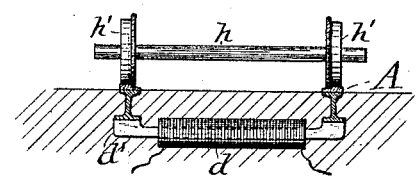

In the drawings, Figure 1 indicates a side elevation of a railway at a grade supplied with my improved apparatus. Fig. 2 is a plan view of the same. Fig. 3 is another plan view of a portion of a railway, showing similar apparatus; and Fig. 4 shows an elevation of the wheels and axle of a vehicle on the track and a cross-section of the road-bed.

Referring specifically to the drawings, A represents the metal or iron track of the railway, and A' is a grade thereof, upon which an electrically-propelled car B is shown.

C C are suspended line-working conductors arranged along the railway to supply current to the electric motor D on the car through the movable contacts $c$ $c$ and the electric connections $c'$ $c'$, carried upon the car.

C' is the source of electricity connected to the line-conductors.

The line-conductors are shown or arranged overhead; but it will be obvious that they may be arranged in a conduit or other suitable position along the railway.

$c''$ indicates a current-regulator in one of the connections $c'$ to control the current flowing through the motor D.

The rails of the grade portion A' of the railway may be separated from the rails of the other or more level portion by some non-magnetizable material $e$ $e$, &c., and the rails of one side of the track are preferably unconnected by magnetizable material with the rails on the other side of the said track.

$b$ $b$ are electric conductors leading from the line-working conductors C C to the coils $d$ $d$ $d$ in the road-bed between the rails of the track. Said coils are distributed at intervals along said track, or a portion thereof, preferably equal distances apart, and are provided with iron cores $d'$ $d'$ $d'$, the poles of which extend to and are in contact with, if not connected to, the rails on opposite sides of the track. The conductor containing the coils, with the conductors $b$ $b$, constitute in Figs. 1 and 2 a shunt-circuit. The coils $d$ $d$ $d$ are preferably placed in circuit in series, as shown; but they may be placed in circuit in any other suitable manner, if desired. The coils are so wound that the north poles of their cores are in contact with the rails on one side of the track and the south poles with the other side, so that the line of rails on one side of the track will have induced in them a north polarity, while the line of rails on the other side will have a south polarity, or the rails on opposite sides of the track will have magnetism of unlike polarity. The said rails may be magnetized at or just before the time the vehicle or car B passes upon the track and demagnetized after the car has passed over the rails, or said rails may be continuously magnetized, which is preferred, as then an attendant or automatic appliances to open and close the circuit will be unnecessary, and on many roads the cars pass so often that there will be little or nothing gained by demagnetizing the rails when no cars are upon them.

$b'$ indicates an adjustable resistance and circuit maker and breaker in one of the conductors $b$ to control the current as desired through the coils. When the car is upon the magnetized rails, its iron wheels $h'$ and axles $h$ will make a complete magnetic circuit, and a maximum effect will be derived; but it will be obvious that some effect will be obtained if the axles are not constructed of magnetic material.

The traction of other self-propelled vehicles may be increased by my apparatus by providing an electric generator for the coil-circuit. Fig. 3 shows a dynamo G, located at the grade for the purpose of generating current for the coils. The said dynamo may be run by any suitable power—as, for instance, an electric motor. The said dynamo may be located at a distance from the grade.

A storage-battery H may be employed instead of the dynamo, if desirable, as shown in dotted lines in the drawings.

When alternating currents are to be utilized for the purpose, they may be rectified or changed into a direct current.

Having described my invention, what I claim as new, and desire to secure by Letters Patent, is—

1. The combination, in an apparatus for electrically increasing the traction of a vehicle moving upon a railway, of a source of electricity, coils distributed at intervals along the railway, a circuit leading from the source of electricity and including the coils, stationary cores in the said coils having their poles connected to or in contact with the rails, and the wheels and axles of the vehicle.

2. The combination, in an apparatus for electrically increasing the traction of a vehicle moving upon a railway, of a suitable source of electricity, coils distributed at intervals along the railway, a circuit leading from the source of electricity and including the coils in series, stationary cores for the said coils having their poles connected to or in contact with the rails on both sides of the track, and the wheels and axles of the vehicle.

3. The combination, in an apparatus for electrically increasing the traction of a vehicle moving upon a railway, of a source of electricity, coils distributed at equal distances apart along the railway, a circuit leading from the source of electricity and including the coils, stationary cores in the coils having their poles connected to or in contact with the rails, and the wheels and axles of the vehicle.

4. The combination, in an apparatus for electrically increasing the traction of a vehicle moving upon a railway, of a source of electricity, coils distributed at intervals along the railway and below the surface of the road-bed, a circuit leading from the source of electricity and including the coils, stationary cores in the said coils having their poles connected to or in contact with the rails, and the wheels and axles of the vehicle.

5. The combination, in an apparatus for electrically increasing the traction of a vehicle moving upon a railway, of a source of electricity, coils distributed at intervals along the railway, a circuit leading from the source of electricity and including the coils, means to regulate the current in the circuit, stationary cores in the said coils having their poles connected to or in contact with the rails, and the wheels and axles of the vehicle.

6. The combination, in an apparatus for electrically increasing the traction of a vehicle moving upon the railway, of a source of electricity, coils distributed at intervals along a portion of the railway, a circuit leading from the source of electricity and including the coils, stationary cores in the said coils having their poles connected to or in contact with the rails, and the wheels and axles of the vehicle.

7. The combination, in an apparatus for electrically increasing the traction of a vehicle moving upon a railway, of a source of electricity, coils distributed at intervals along a grade portion of a railway, a circuit leading from the source of electricity and including the coils, stationary cores in the said coils having their poles connected to or in contact with the rails, and the wheels and axles of the vehicle.

8. The combination of a vehicle moving upon a railway, a source of electricity, coils distributed at intervals along the railway or a portion thereof, line-conductors extending from the source along the railway, a shunt-circuit of the conductors, including the coils, stationary cores in the said coils, having their poles connected to the rails, the wheels and axles of the vehicle, an electric motor for propelling said vehicle, and a circuit including the motor in movable connection with the line-conductors.

9. The combination of a vehicle moving upon a railway, a source of electricity, coils distributed at intervals along a railway or a portion thereof, line-conductors extending from the source along the railway, a circuit including the coils and connected to a line-conductor, stationary cores in the said coils, having their poles connected to the rails, the wheels and axles of the vehicle, an electric motor for propelling said vehicle, and a circuit including the motor in movable connection with the line-conductors.

10. The combination, in an apparatus for electrically increasing the traction of a vehicle moving upon a railway, of a source of electricity, a coil, a circuit leading from the said source and including the coil, a stationary core for the coil, having one of its poles in contact with a rail, and one or more wheels of the vehicle traveling upon said rail.

11. The combination, in an apparatus for electrically increasing the traction of a vehicle moving upon a railway, of a source of electricity, stationary means to magnetize the rails of the railway connected to the source, and magnetizable wheels for the vehicle.

12. The combination, in an apparatus for electrically increasing the traction of a self-propelled vehicle moving upon a railway, of a source of electricity, permanently stationary means to magnetize the rails of the railway or a portion thereof connected to the source, and magnetizable wheels for the vehicle.

In testimony whereof I have hereunto signed my name this 22d day of August, 1890.

MARK W. DEWEY. [L. S.]

Witnesses:
C. H. DUELL,
C. L. BENDIXON.